United States Patent [19]
Bartos

[11] Patent Number: 5,867,980
[45] Date of Patent: Feb. 9, 1999

[54] TURBOFAN ENGINE WITH A LOW PRESSURE TURBINE DRIVEN SUPERCHARGER IN A BYPASS DUCT OPERATED BY A FUEL RICH COMBUSTOR AND AN AFTERBURNER

[75] Inventor: James W. Bartos, Wilmington, Ohio

[73] Assignee: General Electric Company, Cincinnati, Ohio

[21] Appl. No.: 767,932

[22] Filed: Dec. 17, 1996

[51] Int. Cl.$^6$ .................................. F02K 3/02; F02K 3/10
[52] U.S. Cl. ........................... 60/226.3; 60/226.1; 60/261
[58] Field of Search ................................. 60/226.1, 226.3, 60/261, 262, 39.17

[56] References Cited

U.S. PATENT DOCUMENTS

| | | | |
|---|---|---|---|
| 3,046,731 | 7/1962 | Cambel et al. ............................ | 60/261 |
| 3,048,376 | 8/1962 | Howald et al. ......................... | 60/39.17 |
| 3,049,869 | 8/1962 | Grenoble ................................... | 60/261 |
| 3,238,716 | 3/1966 | Sandre . | |
| 3,296,800 | 1/1967 | Kennan et al. . | |
| 3,449,914 | 6/1969 | Brown . | |
| 3,486,338 | 12/1969 | Haussmann et al. ..................... | 60/261 |
| 3,514,952 | 6/1970 | Schumacher et al. . | |
| 3,635,029 | 1/1972 | Menloux . | |
| 3,659,424 | 5/1972 | Polk, Jr. .................................. | 60/269 |
| 3,792,584 | 2/1974 | Klees . | |
| 4,010,608 | 3/1977 | Simmons . | |
| 4,062,182 | 12/1977 | Fehler et al. ............................. | 60/733 |
| 4,085,583 | 4/1978 | Klees ...................................... | 60/261 |
| 4,096,803 | 6/1978 | Kesting . | |
| 4,175,384 | 11/1979 | Wagenknecht et al. . | |
| 4,791,783 | 12/1988 | Neitzel . | |
| 4,813,229 | 3/1989 | Simmons . | |
| 5,074,118 | 12/1991 | Kepler . | |
| 5,402,638 | 4/1995 | Johnson . | |
| 5,404,713 | 4/1995 | Johnson ................................. | 60/226.3 |
| 5,406,787 | 4/1995 | Terrier ................................... | 60/226.3 |

*Primary Examiner*—Timothy Thorpe
*Assistant Examiner*—Ted Kim
*Attorney, Agent, or Firm*—Andrew C. Hess; Rodney M. Young

[57] ABSTRACT

A multiple bypass turbofan engine includes a core Brayton Cycle gas generator with a fuel rich burning combustor and is provided with a variable supercharged bypass duct around the gas generator with a supercharging means in the supercharged bypass duct powered by a turbine not mechanically connected to the gas generator. The engine further includes a low pressure turbine driven forward fan upstream and forward of an aft fan and drivingly connected to a low pressure turbine by a low pressure shaft, the low pressure turbine being aft of and in serial flow communication with the core gas generator. A fan bypass duct is disposed radially outward of the core engine assembly and has first and second inlets disposed between the forward and aft fans. An inlet duct having an annular duct wall is disposed radially inward of the bypass duct and connects the second inlet to the bypass duct. A supercharger means for compressing air is drivingly connected to the low pressure turbine and is disposed in the inlet duct. A secondary combustor or augmentor is disposed in an exhaust duct downstream of and in fluid flow communication with the bypass duct and the gas generator.

18 Claims, 3 Drawing Sheets

TURBOFAN ENGINE WITH A LOW PRESSURE TURBINE DRIVEN SUPERCHARGER IN A BYPASS DUCT OPERATED BY A FUEL RICH COMBUSTOR AND AN AFTERBURNER

BACKGROUND OF THE INVENTION

The Government has rights in this invention pursuant to Contract No. NAS3-26051 awarded by NASA.

FIELD OF THE INVENTION

The present invention relates generally to variable cycle aircraft gas turbine engines and, more particularly, to a variable cycle aircraft gas turbine engine having a low pressure turbine driven supercharger in a bypass duct. More particularly, the supercharger has a variable stator tip controlling the airflow and pressure ratio of its low pressure turbine driven fan tip in the bypass duct.

DISCUSSION OF THE BACKGROUND ART

A gas turbine engine typically includes a gas generator, which is a core engine having in serial axial flow relationship, a high pressure compressor to compress the airflow entering the core engine, a combustor in which a mixture of fuel and the compressed air is burned to generate a propulsive gas flow, and a high pressure turbine which is rotated by the propulsive gas flow and which is connected by a large diameter shaft to drive the high pressure compressor. Rocket engines have also been proposed as gas generators for high speed applications such as that shown in U.S. Pat. No. 5,074,118. However, the use of a rocket engine as the gas generator requires that the craft carry its own oxygen supply which is a highly undesirable weight penalty. The present invention is directed at gas turbine engines incorporating gas generators which are Brayton Cycle engines having combustors that use air ingested from the atmosphere. A typical bypass turbofan engine also has a low pressure turbine aft of the gas generator and a forward fan forward of the gas generator. Where the gas generator is a core engine, a typical bypass turbofan engine adds a low pressure turbine aft of the high pressure turbine and adds a forward fan forward of the high pressure compressor.

In a typical variable bypass ratio design, as disclosed in U.S. Pat. No. 4,068,471, the front fan includes one or more forward rows of fan rotor blades connected to a small diameter drive shaft, which runs through a hollow large diameter shaft of a core gas generator and is driven by the low pressure turbine. The core gas generator includes an aft fan having one or more aft rows of fan rotor blades connected to the larger diameter drive shaft which is driven by the high pressure turbine and are disposed in serial, axial flow relationship between the forward fan and the high pressure compressor. A variable area bypass injector is located between the forward and aft fans to vary the amount of air entering a first inlet of a fan bypass duct which varies the fan bypass ratio of the engine (i.e., the ratio of the air flowing through the fan bypass duct to the air flowing through the core engine) from which comes the term variable cycle to describe the engine. The fan bypass duct has a second inlet located aft of the aft row of fan blades. Control of airflow directed into the first and second bypass duct inlets may be accomplished by selector valve mechanisms and some more particular valves called variable bypass injectors commonly referred to as VABIs.

A variable cycle aircraft gas turbine engine having a fan bypass duct with two or more inlets may be called a multiple bypass stream variable cycle gas turbine engine. A row of stator vanes is typically located just forward of each forward and aft row of fan blades. Selected rows of stator vanes are variable, typically variable angle, to vary the angle of the flow seen by the rotor blades. Some of the engine thrust comes from the propulsive gases exiting the core engine and some from the airflow exiting the fan bypass duct.

Two variable cycle aircraft gas turbine engines having a core driven supercharger in a bypass duct with a variable stator tip controlling the airflow and pressure ratio of its core driven fan tip in the bypass duct are disclosed in U.S. patent application Ser. No. 08/624,288, filed Mar. 29, 1996, entitled "TURBOFAN ENGINE WITH A CORE DRIVEN SUPERCHARGED BYPASS DUCT AND FIXED GEOMETRY NOZZLE" and in U.S. patent application Ser. No. 08/625,498, filed Mar. 29, 1996, entitled "TURBOFAN ENGINE WITH A CORE DRIVEN SUPERCHARGED BYPASS DUCT". These two references disclose multiple bypass stream variable cycle gas turbine engines capable of efficiently holding core airflow essentially constant. Alternatively, these engines are capable of varying airflow while the bypass flow and energy that are added to the second inlet of the bypass duct can be independently decreased without wasting energy in the form of higher than needed pressure in the bypass flow to the bypass duct supplied through the second inlet.

New variable cycle hyperjet (VCHJ) engines incorporating Brayton Cycle gas generators are presently being developed to power several types of aircraft from sea level takeoff conditions to Mach 5.5. One such engine utilizes turbomachinery and an augmentor to provide thrust up to approximately Mach 4.0, where the turbomachinery becomes ineffective. At Mach 4.0 the augmentor is transitioned to a hyperburner as the engine airflow is diverted around the turbomachinery which is then shut down and cocooned for thermal protection. The engine continues to operate at high Mach No. supersonic conditions as a ramjet. The gas generator may be a core engine having high pressure compressor and turbine sections and a fuel rich burning combustor therebetween. Some proposed engines do not incorporate a core engine but use some other type of Brayton Cycle engines with a very fuel rich combustor.

The fuel rich combustor limits the gas path temperature through the turbomachinery of both the core engine, if used, and the low pressure turbine section until the fan bypass air mixes with the core stream behind the low pressure turbine. The remaining fuel in the hot gas flow exiting the gas generator is ignited and combusted after at least the beginning of mixing in an exhaust duct combustor that resembles a conventional augmentor. This augmentor may or may not require any additional fuel be added in the exhaust duct combustor, thereby, possibly eliminating the need for augmentor type fuel injectors and/or conventional bluff body or other types of flame holders. The turbomachinery of the engine may be allowed to wind mill up to the max flight speed such as Mach 5.5. Fuel continues to be added through the main combustor, thus, quenching the temperature of the low pressure turbine as well as turbomachinery of the core engine if so incorporated but producing the required thrust in the secondary combustor or augmentor downstream of the mixing.

A significant performance penalty may exist in such an engine at lower speed sea level conditions where the cycle is most dependant upon excess horsepower generated by the fuel rich Brayton Cycle gas generator. A similar penalty is expected at all of the low Mach No. operating flight conditions. Engines incorporating conventional turbomachinery for a core gas generator can generally be designed to provide the required excess horse power (the net energy resulting from the gas generator which is available to drive a low pressure turbine, or provide thrust, or a combination of the two). Brayton cycle gas generators are relatively limited in their pressure rise characteristics, especially at low flight mach number conditions.

While the cycle looks acceptable at high flight Mach numbers, there is a significant mismatch in the fan and core stream exit pressures at lower speed sea level conditions which would significantly degrade the cycle of such an engine. This is because both the core and the fan bypass streams begin at the same fan discharge pressure. When the LP turbine pressure ratio required to drive the fan exceeds the net pressure rise of the Brayton cycle gas generator, the fan duct discharge pressure will exceed the LP turbine discharge pressure. However, these pressures must be equal in the engine mixer plane where the two streams come together. The excess energy in the fan duct discharge stream flow due to the pressure difference is wasted by the cycle to the extent that the bypass stream velocity cannot be used to transfer the energy to the combined stream. At high flight mach numbers, this difference is small, and has little effect on the cycle. Therefore, a great need exists to better match the fan and core stream exit pressures at lower speed sea level conditions and low Mach No. operating flight conditions of such engines. The present invention provides a variable supercharged bypass duct around the gas generator that according to one analysis can for example, at sea level take off conditions, provide an increase of over 18% in specific thrust and a decrease of about 12% in specific fuel consumption over a comparable engine without the present invention.

Though not incorporating a Brayton Cycle gas generator, U.S. Pat. No. 5,074,118 discloses an air turbo-rocket engine that has a rocket gas generator to drive a turbine which powers a supersonic fan. The fuel rich hydrogen/oxygen gas-generator supplies the correct amount of flow to drive the turbine and provide the power necessary to drive the fan. The hydrogen rich turbine exhaust flow is mixed with the main airstream in a mixing section and burned in a subsonic combustor section before being exhausted through a nozzle. Additional hydrogen may be added prior to combustion to make the overall flow stoichiometric.

SUMMARY OF THE INVENTION

A variable cycle multiple bypass turbofan engine includes a core Brayton Cycle gas generator with a fuel rich burning combustor and a variable supercharged bypass duct around the gas generator. A supercharging means is disposed in the variable supercharged bypass duct powered by a turbine not mechanically connected to the gas generator. The engine further includes a low pressure turbine driven forward fan upstream and forward of an aft fan and drivingly connected to a low pressure turbine by a low pressure shaft, the low pressure turbine being aft of and in serial flow communication with the core gas generator. A fan bypass duct is disposed radially outward of the core engine assembly and has first and second inlets disposed between the forward and aft fans. An inlet duct having an annular duct wall is disposed radially inward of the bypass duct and connects the second inlet to the bypass duct. A supercharger means for compressing air is drivingly connected to the low pressure turbine and is disposed in the inlet duct. A secondary combustor or augmentor is disposed in an exhaust duct downstream of and in fluid flow communication with the bypass duct and the gas generator.

One embodiment of the aft fan may have radially inner and outer rows of aft fan vane airfoils separated by a non-rotatable portion of the annular duct wall such that the outer row of aft fan vane airfoils are disposed in the inlet duct and at least one of the aft fan vane airfoils is, and preferably all are, independently variable. Radially inner and outer rows of aft fan rotor blade airfoils separated by a rotatable portion of the annular duct wall such that the outer row of aft fan rotor blade airfoils are disposed in the inlet duct adjacent to and longitudinally aft of radially inner and outer rows of aft fan vane airfoils, respectively. The radially outer rows of aft fan vane and rotor blade airfoils provide the supercharger means and, preferably, includes a vane varying means for independently varying the radially outer and inner rows of aft fan vane airfoils. A more particular embodiment provides the outer vane airfoils with pivotable, trailing-edge outer flaps and the inner vane airfoils with independently pivotable, trailing-edge inner flaps and, preferably, a flap varying means for independently pivoting the flaps. The radially inner and outer rows of aft fan vane airfoils may be indexed and generally aligned and the radially inner and outer rows of aft fan rotor blade airfoils may be indexed and generally aligned.

The vane tip portion may be fully pivotable or have a pivotable trailing-edge flap and the vane hub portion may include an independently pivotable trailing-edge flap and the flap varying means for independently pivoting the flaps. Preferably, all the fan stator vanes have an independently variable vane tip portion and an independently variable vane hub portion separated by the annular duct wall.

In one particular embodiment, the Brayton Cycle gas generator is a core engine having, in downstream serial flow relationship a core compressor, a core combustor, and a core turbine. The core turbine is drivingly connected to the core compressor by a core engine shaft. The core turbine may have a row of high pressure turbine stator vanes and variable turbine means for varying the flow area of the high pressure turbine nozzle vanes. The low pressure turbine may further include a row or rows of counter-rotating low pressure turbine rotor blades disposed longitudinally adjacent and longitudinally aft of the core turbine such that the row of low pressure turbine blades are operable to counter-rotate relative to high pressure turbine rotor blades in the core turbine during engine operation. Alternatively, the low pressure turbine may further include a row of low pressure turbine rotor blades disposed longitudinally adjacent and longitudinally aft of the core turbine, a row of low pressure turbine stator vanes disposed longitudinally between the core turbine aft and the forward row of low pressure turbine blades and variable turbine means for varying the flow area of the low pressure turbine nozzle vanes.

ADVANTAGES OF THE INVENTION

The present invention provides advantages over previous designs of variable cycle hyperjet engines incorporating Brayton Cycle gas generators with fuel rich burning combustors because of the greater range of operability over the flight envelope of the engine due to the aft fan stage or stages. The present invention has the advantage of allowing an engine incorporating a Brayton Cycle gas generator with a fuel rich burning combustor to develop sufficient thrust at sea level takeoff conditions and yet operate efficiently at higher mach numbers such as about Mach 5.5. Several benefits and advantages are derived from having independently variable radially inner and radially outer portions of the fan stator vanes in a multiple bypass stream, variable bypass ratio turbofan engine. For example, with the split, variable stator vane feature, a low pressure turbine can be used to power a low pressure fan to bypass airflow to an aft duct afterburner. The bypass flow and the energy added to the second inlet of the bypass duct can be independently started at a high level and then decreased without decreasing the engine's efficiency. Alternatively, the split variable stator vane feature can be used so the gas generator airflow can be increased while the bypass flow and the energy added to the second inlet of the bypass duct can be independently decreased without decreasing the engine's efficiency. The improved engine efficiency is a result of providing the ability to independently vary the pressure ratio across inner hub and outer tip sections of airfoils of the low turbine driven aft fan which the prior art does not provide for. Also, this feature can improve engine efficiency by increasing the range to choke of the bypass stator vane airfoils or tip sections located in the inlet duct downstream of the second inlet to the bypass duct. Varying the flow area of the high pressure turbine nozzle vanes in response to varying engine operating conditions can further increase engine efficiency.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
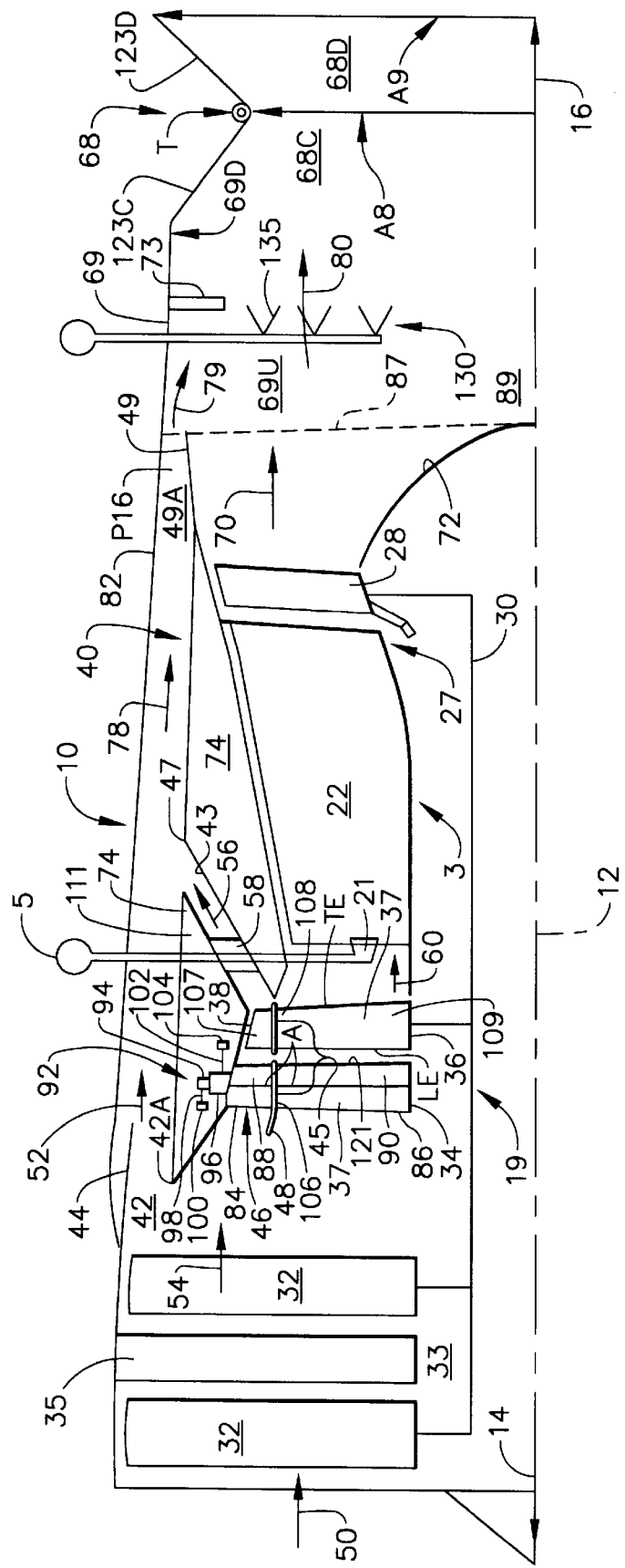
FIG. 1 is a schematic cross-sectional view of a bypass turbofan engine in accordance with the present invention.

Referring now to the drawing, there is schematically illustrated in FIG. 1 a bypass turbofan engine 10 having a generally longitudinally extending axis or centerline 12 generally extending in a forward direction 14 and an aft direction 16. The bypass turbofan engine 10 includes a Brayton Cycle gas generator 3 with a fuel rich burning combustor 22 which is particularly useful when burning hydrogen from a fuel hydrogen supply means such as a tank 5 in a high Mach No. engine capable of operating from ground level to around Mach 5.5 or higher. The fuel rich burning combustor 22 discharges combustion gases into a low pressure turbine (LPT) 27 having a row of low pressure turbine rotor (LPT) blades 28. Fuel rich combustion gases discharged into the LPT 27 may have a low enough temperature so as to quench or cool the LPT and avoid the need to use expensive cooling air to cool the LPT. The low pressure turbine rotor blades 28 are fixedly attached to a smaller diameter annular low pressure shaft 30 which is disposed coaxially about the centerline 12 of the engine 10 and passes through a section of the engine containing the gas generator 3, thus, forming a low pressure spool. The low pressure shaft 30 rotates a forward fan 33 having two more longitudinally forward rows of generally radially outwardly extending and circumferentially spaced-apart forward fan rotor blades 32. The low pressure shaft 30 also rotates an aft fan 19 having a more longitudinally aft row of circumferentially spaced apart LPT driven aft fan rotor blades 36 having generally radially outwardly extending blade tips 38.

The aft fan rotor blades 36 are disposed longitudinally aft of the more longitudinally forward row of forward fan rotor blades 32. A row of circumferentially spaced-apart aft fan stator vanes 34 (attached at either or both radial ends) is disposed longitudinally between the rows of the forward and aft fan rotor blades 32 and 36, respectively, and longitudinally adjacent and in direct serial flow relationship with the row of the aft fan rotor blades 36. Note that the engine, as illustrated in the drawings, has two rows of forward fan blades but that one or more than two rows of forward fan rotor blades and/or fan stator vanes may be used. The drawings herein also include a preferred row of forward fan stator vanes 35 disposed longitudinally adjacent and between the two rows of forward fan rotor blades 32. The term "longitudinally adjacent" is used herein, for the purposes of this patent, to mean that there are no other rotor blade rows and/or stator vane rows between the named longitudinally adjacent elements (i.e., between the more forward row of fan rotor blades 32 and the optional additional row of fan stator vanes 35).

Figure 2:
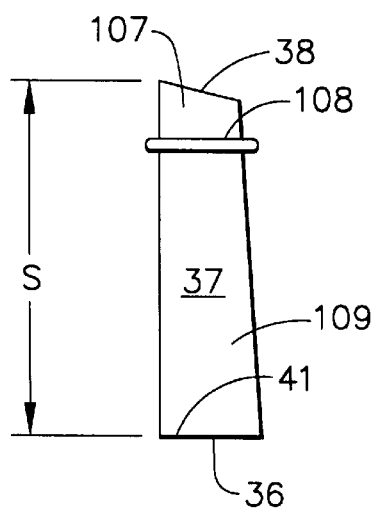
FIG. 2 is an enlarged more detailed view of the aft fan blade in FIG. 1.

A fan bypass duct 40 for bypassing fan airflow around the gas generator is radially located between an engine inner casing 74 and an engine outer casing 82 and has a has a first inlet 42 disposed longitudinally between the forward fan 33 and the aft fan 19. When the optional additional row of forward fan stator vanes 35 is present, the first inlet 42 is disposed longitudinally between the optional additional row of forward fan stator vanes 35 and the aft row of fan stator vanes 34. The first inlet 42 includes a front selector valve door 44 and a first flow splitter 42A. A second inlet 46 to the fan bypass duct 40 is also disposed longitudinally between the forward fan 33 and the aft fan 19, thereby, providing two parallel bypass flowpaths into the fan bypass duct from the forward fan. The fan bypass duct 40 is in fluid communication with a second inlet 46 by way of a second inlet duct 43 having a second inlet duct outlet 47 to the fan bypass duct 40. The second inlet 46 includes an annular duct wall 45 with a second flow splitter 48. The annular duct wall 45 includes a rotatable portion 108 that is disposed radially between outer blade tip portions 107 and radially inner blade hub portions 109, respectively, of blade airfoils 37 of the aft fan blades 36. Briefly referring to FIG. 2, the annular duct wall 45 includes a rotatable portion 108 that is disposed radially between outer blade tip portions 107 and radially inner blade hub portions 109, respectively of blade airfoils 37 of the aft fan blades 36. The blade airfoil 37 extends from a blade base 41 to the blade tip 38 and the rotatable portion 108 is located at a location along a span S of the airfoil preferably near the blade tip. Referring back to FIG. 1, the annular duct wall 45 also includes a non-rotatable portion 106 that is disposed between, preferably variable angle, radially outer vane tip portions 84 and radially inner vane hub portions 86 of the fan vanes 34. The fan bypass duct outlet 49A is disposed longitudinally aft of the second inlet 46 and includes an optional rear variable area bypass injector (VABI) door 49.

The engine or fan airflow 50 passes through the more forward row of fan blades 32 and is then split into a gas generator portion or core airflow 60 and bypass flow 54. The bypass flow 54 may include one or both of a first bypass airflow portion 52 which passes through the first inlet 42 of the fan bypass duct 40 and a second bypass airflow portion 56 which passes through the second inlet 46 of the fan bypass duct 40, depending on the engine's operation. A combined bypass air 78 is formed by the first bypass airflow portion 52 and the second bypass airflow portion 56. At high power takeoff, the front selector valve door 44 is substantially open, and the vane tip portions 84 are substantially closed and the first bypass airflow portion 52 is at or near maximum and the second bypass airflow portion 56 is essentially zero. As the first bypass airflow portion 52 is decreased when the engine begins to reach higher supersonic speed conditions, the second bypass airflow portion 56 increases in more or less direct proportion.

At low flight Mach Number high power conditions, it is one of the objects of this invention to optimize the engine cycle by moderating the pressure rise of the combined bypass air 78 relative to the core airflow 60 in order to match the fan bypass and LPT discharge pressures in a mixing plane 87. This is accomplished by opening the front selector valve door 44. At the same time, the second inlet 46 is effectively closed by rotating the vane trailing edge tip flap 88 of the vane outer tip portion 44 closed. This maximizes the first bypass airflow portion 52 while effectively shutting off the second bypass airflow portion 56. Because the second bypass airflow portion 56 is near zero, no work is done by the aft fan tip portion, resulting in a good match of pressures at the engine mixing plane 87. As the engine accelerates to higher mach numbers, the vane tip flap 88 is incrementally opened, increasing the second bypass airflow portions 56, while at the same time the forward bypass selector valve 44 is closed, decreasing the first bypass airflow portion 52 in more or less direct proportion. At high flight Mach Numbers, the forward selector valve 44 is fully closed and all of the combined bypass air 78 passes through the second inlet 46, passing through the aft fan tip portion to the second inlet duct outlet 47.

At high flight Mach Number conditions when the front selector valve door 44 is closed, the fan airflow 50 is split between the core airflow 60 passing through the row of fan stator vanes 34 and the more aft row of fan blades 36 and the second bypass airflow portion 56. The second bypass airflow portion 56 passes through the second inlet 46 and past the outer vane tip portions 84 and the blade tip portions 107 together which provide a supercharger means for compressing the second bypass airflow portion 56 in the second inlet duct 43. The blade tip portions 107 compress or supercharge the second bypass airflow portion 56 relative to the core airflow 60 and the variable outer vane tip portions 84 provide control, thus, providing preferably variable and controllable supercharging means of the second bypass airflow portion 56, which under certain operating conditions such as at high Mach No. acceleration or cruising airspeeds, may be essentially all of the bypass flow passing around the gas generator 3 through the fan bypass duct 40 when the selector valve door 44 is in a fully closed position.

A row of bypass stator vanes 58 may be disposed in the second inlet duct 43 to help provide a tailored local flowpath design that permits the first bypass airflow portion 52 to mix with the second bypass airflow portion 56 with a minimal amount of losses whenever the front selector valve door 44 is open.

Preferably, the supercharging means includes vane varying means 92 for independently varying at least one and, preferably all, of the radially outer vane tip portions 84 and the radially inner vane hub portions 86 of the fan vanes 34 about respective axis A. Such vane varying means may also be described as to include at least one of the fan stator vanes 34 having a variable one of the vane tip portions 84 and an independently variable one of the radially inner hub portions 86. Preferably, the vane tip portion 84 includes a pivotable trailing-edge tip flap 88 and the radially inner hub portion 86 includes a pivotable trailing-edge inner flap 90.

A more particular embodiment of the invention provides a flap varying means for independently pivoting the tip flaps 88 and inner flaps 90. Such flap varying means is illustrated by an inner shaft 94 rotatable about the axis A and coaxially disposed within an outer shaft 96. The inner shaft 94 is turned by a lever arm 98 actuated by a unison ring 100 and the outer shaft 96 turned by a separate lever arm 102 actuated by a separate unison ring 104, with the inner shaft 94 attached to the pivotable trailing edge inner flap 90 of the inner hub portion 86 of the fan stator vane 34 and the outer shaft 96 attached to the pivotable trailing edge tip flap 88 of the outer portion 84 of the fan stator vane 34. It is noted that the lever arms 98 and 102 and the unison rings 100 and 104 are all disposed radially outward of the fan stator vanes 34. Many types of vane varying means are well known in the art such as those known for pivoting variable stator vanes of high pressure compressors in jet engines and the like.

The non-rotatable portion 106 and the rotatable portion 108 of the annular duct wall 45 are located at a part span position in the present invention and are different from the mid span or mid shrouds of more conventional and prior art designs. The non-rotatable portion 106 and the rotatable portion 108 of the annular duct wall 45 segregate the tip portion from the hub portions of the blade airfoil or inner and outer airfoils and associated airflows. The rotatable portion 108 of the blade airfoils 37 of the aft fan blades 36 is literally an extension to the front stage of an otherwise conventional core compressor. In a preferred embodiment, all of the fan stator vanes 34 in its row have a variable outer vane tip portion 84 and an independently variable radially inner hub portion 86. The vane varying means 92 is preferably operable to vary all of the vane tip portions 84 as a group and independently vary all of the radially inner portions 86.

The radially outer blade tip portion 107 must deliver a pressure such that it's airflow is mixable with the gas flow exiting from the low pressure turbine 27. The radially outer blade tip portions 107 and radially inner blade hub portions 109 respectively of blade airfoils 37 of the aft fan blades 36 may have different airfoils with separate non-continuous profiles and leading and trailing edges LE and TE, respectively. The airfoils of the outer blade tip portions 107 may or may not be indexed, one to one, and generally aligned with the airfoils of the inner blade hub portions 109. The same construction may also be applied to the radially outer vane tip portions 84 and the radially inner vane hub portions 86 of the fan vanes 34. The vane tip portion 84 may have an extended length pivotable trailing-edge tip flap 88 that extends aft of the flap trailing edge 121 of the independently pivotable trailing-edge inner flap 90 radially inner hub portion 86. Annular seals 45S may be used between the rotatable portion 108 of the annular duct wall 45 and adjacent stationary portions of the wall just forward and aft of it. The optional different airfoil profiles of the inner and outer blade and vane members of the aft fan 19 allow aerodynamic tuning of the supercharger means in the second inlet duct 43.

The core airflow 60 passes through the radially inner blade hub portions 109 of the blade airfoils 37 of the aft fan blades 36 and into the rich burning combustor 22. The fuel rich burning combustor 22 is particularly useful when burning hydrogen from the fuel hydrogen supply means indicated by the tank 5 under fuel rich mixture of air and fuel, whereby, the fuel is injected by gas generator fuel injectors 21 at rates which greatly exceed stoichiometric rates. This produces a relatively very cool effluent from the gas generator even when the gas generator 3 is operated at high Mach Number speeds. This fuel rich effluent (or combustion gases) is discharged into the LPT 27 at a temperature that is low enough so as to quench or cool the LPT sufficiently to avoid the need to use expensive cooling air to cool the LPT is so desired.

The core airflow 60 is discharged from the low pressure turbine 27 past the low pressure turbine blades 28 between the engine inner casing 74 and a centerbody 72 at which point it is referred to as a core discharge flow 70. The combined bypass air 78 (first bypass airflow portion 52 plus second bypass airflow portion 56) flows through a rear variable area bypass injector (VABI) door 49 where it is injected into a mixing section 89 upstream of an exhaust duct 69 as bypass discharge flow 79 and is mixed with the core discharge flow 70. The mixing of the fuel rich core discharge flow 70 with the bypass discharge flow 79 forms a combined mixed flow 80 and will cause the fuel remaining in the core discharge flow (which is greater than a stoichiometric fuel to air ratio) in the discharge flow 70 to ignite or if needed additional ignition means may be used such as conventional afterburner igniters 73.

An afterburner 130 may be located downstream of the upstream end 69U of the exhaust duct 69 where the mixed core discharge flow 70 and bypass discharge flow 79 may be further energized by thrust augmentation of the afterburner using augmenting fuel injectors 135. Downstream of the afterburner 130 at a downstream end 69D of the exhaust duct 69 is an exhaust nozzle 68, which may be axi-symmetric or two dimensional, with a fixed or variable convergent section 68C and a fixed or variable divergent section 68D and a throat T located between the convergent and divergent sections. The convergent and divergent section 68C and 68D, respectively, may be formed from convergent and divergent flaps 123C and 123D, respectively, which may be hinged together at the throat T and convergent and divergent seals (not shown). If the variable divergent section 68D is used then the ratio of throat area A8 to exit area A9 (conventionally referred to A8/A9) may be varied with the divergent flaps 123D being hinged to the convergent flaps 123C at the throat T. The throat area A8, fixed or variable, is a minimum area in the exhaust nozzle 68. A mechanically fixed throat area A8 provides weight and cost savings and benefits due to the fewer mechanical parts used and a lesser amount of mechanical complexity required of such a design.

Figure 4:
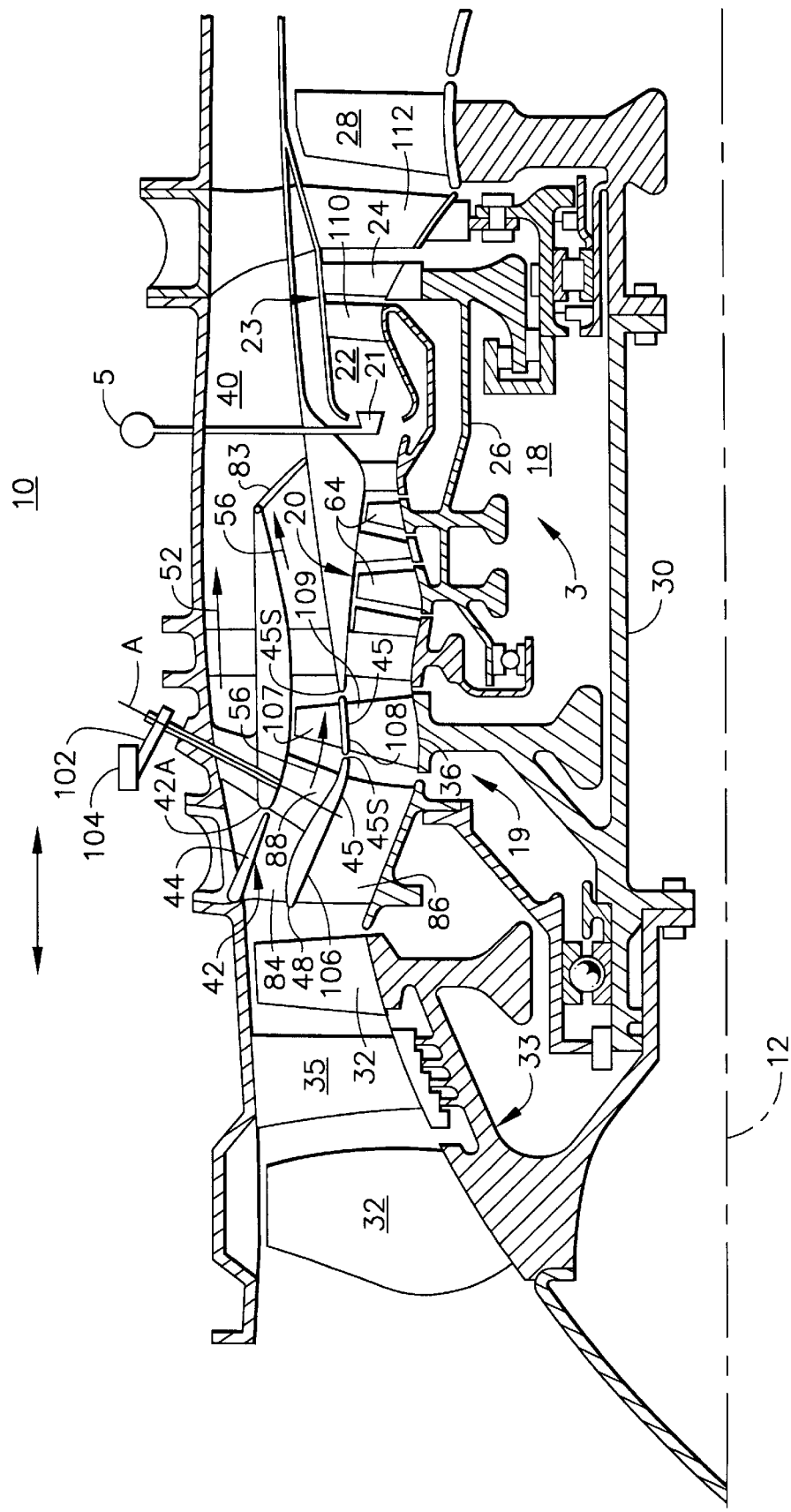
FIG. 4 is a cross-sectional view of a forward section of the engine illustrating a more particular embodiment of the fan bypass assembly and turbocharger of the present invention.

A more particular embodiment of the present invention is illustrated in FIG. 4 which shows the fan sections of the engine 10 and the gas generator 3 which is a core engine 18. The core engine 18 includes a high pressure compressor 20, the rich fuel burning combustor 22, and a high pressure turbine (HPT) 23 having a row of high pressure turbine (HPT) blades 24, all arranged in a serial, axial flow relationship. High pressure compressor blades 64 of the high pressure compressor 20 are fixedly interconnected in driving engagement to the high pressure turbine blades 24 by a larger diameter annular core engine shaft 26 which is disposed coaxially about the centerline 12 of the engine 10 forming a high pressure spool.

The core engine 18 together with the fuel rich burning combustor 22 is effective for generating relatively cool fuel rich combustion gases as explained above. Pressurized air from the high pressure compressor 20 is mixed with fuel at greater than stoichiometric rates in the combustor 22 and ignited, thereby, generating the combustion gases. Some work is extracted from these gases by the high pressure turbine blades 24 which drives the high pressure compressor 20. The combustion gases are discharged from the core engine 18 into a power turbine or low pressure turbine (LPT) 27 having a row of low pressure turbine rotor (LPT) blades 28. The low pressure turbine rotor blades 28 are fixedly attached to a smaller diameter annular low pressure shaft 30 which is disposed coaxially about the centerline 12 of the engine 10 within the core engine shaft 26 forming a low pressure spool. The low pressure shaft 30 rotates a more longitudinally forward row of generally radially outwardly extending and circumferentially spaced-apart forward fan rotor blades 32 of a forward fan 33 and aft fan rotor blades 36 having generally radially outwardly extending blade tips 38. The aft fan rotor blades 36 are disposed longitudinally aft of the more longitudinally forward row of forward fan rotor blades 32. The gas generator may also include fixed or variable HPT stator vanes 110 and fixed or variable LPT stator vanes 112. If the LPT stator vanes 112 are not used then the HPT blades 24 and the LPT blades 28 may be are counter-rotating with respect to each other. The variable stator vanes provide a variable turbine means for varying the flow area of the respective turbine nozzle vanes.

Illustrated in FIG. 4 is another alternative embodiment in which the fan bypass duct 40 may optionally further include a second bypass duct selector valve or door 83 which is disposed longitudinally between the second inlet 46 and the outlet 47 and which is positionable for controlling the operating line of the blade tips 38 of the aft fan 19 and adjusting the static pressure level to maintain the mixing potential of the outer and inner bypass flows illustrated as the first and second bypass airflow portions 52 and 56, respectively.

Initially, the pressure in the bypass duct 40 is higher than discharge pressure of the forward fan 33 by the pressure ratio of the blade tip portion 107 of aft fan 19. Because of this, a bypass selector valve in the form of the selector valve door 44 is employed in the bypass duct 40 between the exit of the forward fan 33 and the outlet 47 of the second inlet duct 43 to prevent a recirculation of flow around an annular island 111 that provides the casing for the aft fan 19 and the inner flowpath for the outer fan bypass duct 40. With a sufficient reduction in power setting a condition occurs wherein the pressure difference across the bypass selector valve reverses sign and the selector valve door 44 can be opened. Until this condition is reached, the full airflow potential of the blade tip portion 107 of the aft fan 19 must be retained. This is because any reduction in its airflow potential will be manifested in an increase in the forward fan 33 operating line and a loss in available stall margin will result. After the bypass selector valve has opened, the airflow potential of the blade tip portion 107 can be diminished and the excess flow delivered by the fan can then be bypassed around the aft fan 19 via the outer fan bypass duct 40.

Figure 3:
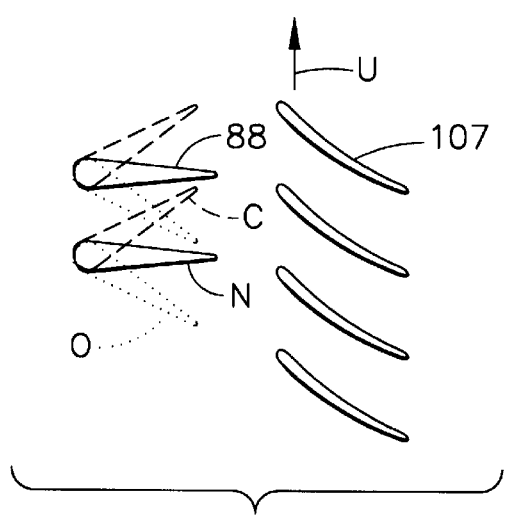
FIG. 3 is a diagrammatic top view of pivotable trailing-edge tip flaps and outer blade tip portions of the turbocharger means of the present invention.

The diminished airflow capability of the blade tip portion 107 of the aft fan 19 is accomplished by closure of the variable pivotable trailing-edge flap 88 of the vane tip portion 84 in the flowpath within the annular duct wall 45 of the second inlet 46 forward of the blade tip portion 107. Note that this embodiment does not include a pivotable trailing-edge inner flap 90 as in the embodiment illustrated in FIG. 1, the flap varying means does not have to independently pivot the inner flap thus not requiring all of the equipment used to do so, such as the inner shaft 94, the lever arms 98, and unison ring 100. A result of this closure is that the pressure ratio potential of the blade tip portion 107 is diminished and both the airflow reduction and pressure ratio reduction act together to reduce the energy required to drive the blade tip portion of the engine, which is a very desirable effect from an engine efficiency and specific fuel consumption standpoint. Closure is not a full closing off of the second bypass airflow portion 56 in the inlet duct 43 but rather refers to closing the angle to a closed position C indicated by the dashed outline of the variable pivotable trailing-edge flap 88 of the vane tip portion 84 relative to a nominal position N and direction of the rotatable the blade tips portion 107 which rotate a speed and direction U as illustrated in FIG. 3. An opened position O indicated by the dotted outline of the trailing-edge flap 88 and a nominal position N indicated by the solid outline of the trailing-edge flap are also illustrated. The open position allows a greater flow rate, until a choking condition is encountered in passages between the vane tip portions 84, while the closed position reduces the flow rate as compared to the flow rate when the trailing-edge flaps 88 are at the nominal position N. Varying a vane, or in this case the trailing-edge flaps 88, conventionally refers to varying the angle between open and closed positions relative to a nominal position and wheel or rotor speed U.

The above description addresses a typical off design operating scenario for the present invention. The invention also offers a design capability and advantage which is also important. Generally, the blade hub 109 of the aft fan 19 can be designed to operate at or near its highest pressure ratio potential. This allows the elimination of a pressure compressor that would otherwise not be possible, a seemingly obvious design goal. The overall fan pressure ratio, i.e. the product of low pressure spool pressure ratio with the pressure ratio of the blade tip portion 107 of the aft fan 19, is a fallout of the cycle analysis and depends upon all of a myriad of assumptions that are assembled into a design matchpoint. The sensitivity of overall fan pressure ratio varies widely within the normal range of assumptions, therefore, each new situation needs to be examined on its own merits. The fans will want to operate at or near their highest potential. The required pressure ratio of the blade tip portion 107 of the aft fan 19 falls out from the division of the required overall fan pressure ratio by the low pressure spool fan pressure ratio. The resulting aft fan tip pressure ratio may be near, well below or well above the pressure ratio potential of the blade hub 109 of the aft fan 19. Without the circumferential annular rotatable portion 108 of the annular duct wall 45 disposed between radially outer blade tip and radially inner blade hub portions 107 and 109, respectively, dividing the blade airfoils 37 into two distinctly different regions, a sort of natural continuum between hub and tip portions would exist. This is because the static pressure cannot be discontinuous without the physical division and because the blading will be a smooth and continuous blend from the blade base 41 to the blade tip 38. It is incumbent upon the analyst to contain all of these items with bounds but a fundamental capability is available in the aft fan 19 to enable a fine tuning of the cycle.

In operation, as can be appreciated by those skilled in the art, the variable geometry fan features and the selector valve and VABI and intermediate mixer doors permit bypass duct pressure levels to be controlled independently from core supercharging pressure levels. Also, the variable geometry turbine systems allow overall cycle pressure ratio to be controlled as turbine temperature varies to match the cycle balance requirements of the variable fan pressure ratio system. The variable geometry fan feature further allows the core fan tip pressure to be phased out as ram pressure at engine inlet increases and to help set the operating conditions in the afterburner and exhaust nozzle.

The foregoing descriptive embodiments of the invention have been presented for the purpose of describing and illustrating the invention. It is not intended to be exhaustive or to limit the invention to the precise form disclosed, and obviously many modifications and variations are possible in light of the above teachings. While the preferred embodiment of the invention has been described fully in order to explain its principles, it is understood that various modifications or alterations may be made to the preferred embodiment without departing from the scope of the invention as set forth in the appended claims.

What is claimed is:

1. A multiple bypass turbofan engine comprising:
   a Brayton Cycle gas generator having a fuel rich burning combustor;
   a fan section comprising in downstream serial flow relationship a forward fan and an aft fan;
   said fan section upstream and forward of said gas generator and drivingly connected to a low pressure turbine by a low pressure shaft that is aft of and in serial flow communication with said gas generator;
   a fan bypass duct disposed radially outward of said gas generator and having first and second annular inlets disposed between said forward and aft fans;
   an annular inlet duct having an annular duct wall, disposed radially inward of said bypass duct, said annular duct wall and said annular inlet duct connecting said second inlet to said bypass duct;
   an exhaust duct downstream of and in fluid communication with said fan bypass duct and said low pressure turbine at an upstream end of said exhaust duct;
   said exhaust duct comprising in downstream serial flow relationship a mixing section, a combustion section, and an exhaust nozzle; and
   a supercharger means for compressing air, said supercharger disposed in said inlet duct and drivingly connected to said low pressure turbine;
   said aft fan having a row of aft fan rotor blades disposed adjacent to and longitudinally aft of a row of aft fan stator vanes;
   said aft fan rotor blades having airfoils that generally extends radially outward from blade airfoil bases to airfoil tips;
   said supercharger means comprising:
      at least one of said aft fan stator vanes having an independently variable radially outer vane tip portion and an independently variable radially inner van hub portion separated by a non-rotatable portion of said annular duct wall, and
      said aft fan blades having radially outer airfoil tip sections and radially inner hub sections of airfoils separated by a rotatable portion of said annular duct wall, such that said tip sections are disposed in said inlet duct.

2. A multiple bypass turbofan engine as claimed in claim 1, further comprising an afterburner fuel injection means for injecting fuel into said combustion section.

3. A multiple bypass turbofan engine as claimed in claim 1, further comprising a means for independently varying said vane tip portion and said vane hub portion.

4. A multiple bypass turbofan engine as claimed in claim 3, wherein said vane tip portion includes a pivotable, trailing-edge tip flap and said vane hub portion includes an independently pivotable, trailing-edge hub flap.

5. A multiple bypass turbofan engine as claimed in claim 4, wherein said varying means includes means for independently pivoting said flaps.

6. A multiple bypass turbofan engine as claimed in claim 5, wherein all of said fan stator vanes have independently variable radially outer vane tip portions and independently variable radially inner vane hub portions separated by said non-rotatable portion of said annular duct wall.

7. A multiple bypass turbofan engine as claimed in claim 6, further comprising an afterburner fuel injection means for injecting fuel into said combustion section.

8. A multiple bypass turbofan engine as claimed in claim 1, wherein said Brayton Cycle gas generator comprises a core engine assembly comprising in downstream serial flow relationship a core driven aft fan, a core compressor, a core combustor, and a core turbine, and wherein said core turbine is drivingly connected to said core compressor by a core engine shaft.

9. A multiple bypass turbofan engine as claimed in claim 8, further comprising an afterburner fuel injection means for injecting fuel into said combustion section.

10. A multiple bypass turbofan engine as claimed in claim 8, further comprising a means for independently varying said vane tip portion and said vane hub portion.

11. A multiple bypass turbofan engine as claimed in claim 10, wherein said vane tip portion includes a pivotable, trailing-edge tip flap and said vane hub portion includes an independently pivotable, trailing-edge hub flap.

12. A multiple bypass turbofan engine as claimed in claim 11, wherein said varying means includes means for independently pivoting said flaps.

13. A multiple bypass turbofan engine as claimed in claim 12, wherein all of said fan stator vanes have independently variable radially outer vane tip portions and independently variable radially inner vane hub portions separated by said non-rotatable portion of said annular duct wall.

14. A multiple bypass turbofan engine as claimed in claim 13, further comprising an afterburner fuel injection means for injecting fuel into said combustion section.

15. A multiple bypass turbofan engine as claimed in claim 12, wherein said vane tip portions include pivotable, trailing-edge tip flaps and said vane hub portions include independently pivotable, trailing-edge hub flaps.

16. A multiple bypass turbofan engine as claimed in claim 15, wherein said varying means includes means for independently pivoting said flaps.

17. A multiple bypass turbofan engine as claimed in claim 15, said core turbine further comprising a row of high pressure turbine stator vanes and means for varying the flow area of said high pressure turbine nozzle vanes.

18. A multiple bypass turbofan engine as claimed in claim 15, said low pressure turbine further comprising a row of counter-rotating low pressure turbine rotor blades disposed longitudinally adjacent and longitudinally aft of said core turbine such said row of low pressure turbine blades are operable to counter-rotate to high pressure turbine rotor blades in said core turbine during engine operation.

* * * * *